UNITED STATES PATENT OFFICE.

MAX BUFF, OF VOHWINKEL, NEAR ELBERFELD, AND ALFRED THAUSS, OF DEUTZ, NEAR COLOGNE, GERMANY, ASSIGNORS TO SYNTHETIC PATENTS CO. INC., OF NEW YORK, N. Y., A CORPORATION OF NEW YORK.

SULFUR COLORS.

1,175,230. Specification of Letters Patent. Patented Mar. 14, 1916.

No Drawing. Application filed November 13, 1914. Serial No. 872,006.

*To all whom it may concern:*

Be it known that we, MAX BUFF and ALFRED THAUSS, doctors of pholosophy, chemists, citizens of the German Empire, residing, respectively, at Vohwinkel, near Elberfeld, and Deutz, near Cologne, Germany, have invented new and useful Improvements in Sulfur Colors, of which the following is a specification.

Our invention relates to the manufacture and production of new and valuable blue surfur colors which are obtained by treating with alkali polysulfids the leucoindophenols of the formula:

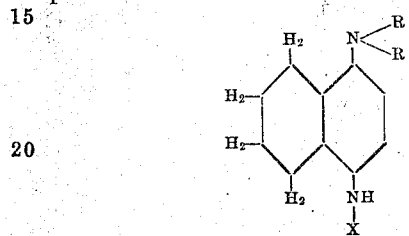

(R includes hydrogen and alkyl; X means an oxyaryl of the benzene series) or the corresponding indophenols. The new indophenols or leucoindophenols used for this manufacture can be obtained by treating in an acid solution with oxidizing agents, such as sodium bichromate, an equi-molecular mixture of tetrahydro-alpha-naphthylamin or its mono- or dialkylated derivatives and para-aminophenol or its substitution products. The leucoindophenols can be obtained from the indophenols by reduction. The new indophenols all contain the tetrahydronaphthalene nucleus attached to amino groups and have the partial formula:—

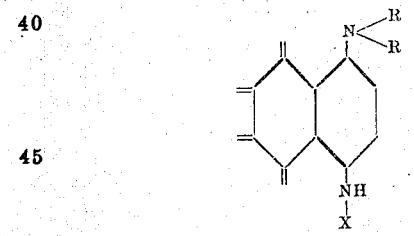

They are bluish products soluble in caustic soda lye with an intense red coloration. In concentrated sulfuric acid the indophenols derived from para-aminophenol are soluble with a blue, those derived from chloro-para-aminophenols with a violet-red coloration. The new dyes are after being dried and pulverized bark blue powders yielding dye-vats with a hot solution of sodium sulfid; they are soluble in concentrated sulfuric acid generally with a blue coloration and dye cotton in blue shades distinguished by their fastness to boiling.

In order to illustrate the new process more fully the following example is given, the parts being by weight:—85 parts of calcined sodium sulfid (60 per cent. $Na_2S$), 70 parts of pulverized sulfur, 25.5 parts of the leucoindophenol (obtained from tetrahydroalphanaphthylamin and para-aminophenol) having most probably the formula:

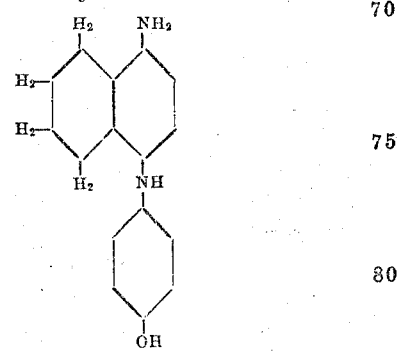

and 300 parts of alcohol are boiled during 70–80 hours in a vessel provided with a reflux condenser. The alcohol is then distilled off, the residue is treated with hot water, filtered off and washed with hot water and then with a boiling solution of sodium sulfid. The new coloring matter is after being dried and pulverized a dark blue powder. It is soluble in concentrated sulfuric acid with a reddish-blue coloration. It dyes cotton from a hydrosulfite vat in pure reddish-blue shades fast to boiling. In the same way other of the above mentioned leucoindophenols or indophenols may be used, *e. g.* that obtained from para-aminophenol and ethyl-alpha-naphthylamin or indophenols from halogenated para-aminophenols, etc., para-amino-ortho-cresol, dichloro-para-aminophenol.

The above mentioned quantities of sodium sulfid and of sulfur as well as the temperature and the duration of the reaction can be varied within wide limits.

We claim:—

1. The herein described new sulfur dyes being sulfur containing derivatives of indophenols which latter are obtainable from a para-amino-phenol and an alpha-amino derivative of a tetrahydronaphthalene compound, said sulfur dyes after being dried and pulverized being dark blue powders yielding dye-vats with a hot solution of sodium sulfid, being soluble in concentrated sulfuric acid generally with a bluish coloration; and dyeing unmordanted cotton blue shades fast to boiling, substantially as described.

2. The herein described new sulfur dyes being sulfur containing derivatives of leucoindophenols having the partial formula:

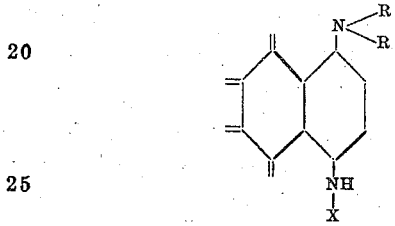

(R includes hydrogen and alkyl; X means an oxyaryl of the benzene series) which are after being dried and pulverized dark blue powders yielding dye-vats with a hot solution of sodium sulfid, being soluble in concentrated sulfuric acid generally with a bluish coloration; and dyeing unmordanted cotton blue shades fast to boiling, substantially as described.

3. The herein described new sulfur dyes being sulfur containing derivatives of leucoindophenols of the formula:

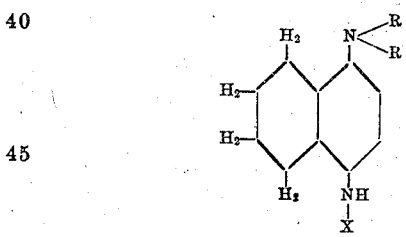

(R includes hydrogen and alkyl; X means an oxyaryl of the benzene series) which are after being dried and pulverized dark blue powders yielding dye-vats with a hot solution of sodium sulfid, being soluble in concentrated sulfuric acid generally with a bluish coloration; and dyeing unmordanted cotton blue shades fast to boiling, substantially as described.

4. The herein described new sulfur dyes being sulfur containing derivatives of leucoindophenols of the formula:

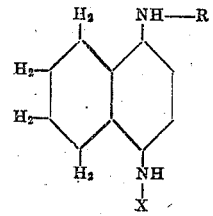

(R includes hydrogen and alkyl; X means a phenolic radical) which are after being dried and pulverized dark blue powders yielding dye-vats with a hot solution of sodium sulfid, being soluble in concentrated sulfuric acid generally with a bluish coloration; and dyeing unmordanted cotton blue shades fast to boiling, substantially as described.

5. The herein described new sulfur dye being a sulfur containing derivative of the leucoindophenol of the formula:

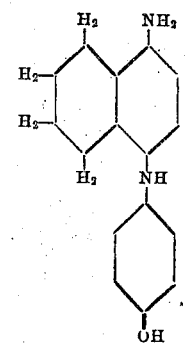

which dye is after being dried and pulverized a dark blue powder soluble in concentrated sulfuric acid with a reddish-blue coloration; and dyeing unmordanted cotton from a hydrosulfite vat in pure blue shades fast to boiling, substantially as described.

In testimony whereof we have hereunto set our hands in the presence of two subscribing witnesses.

MAX BUFF. [L. S.]
ALFRED THAUSS. [L. S.]

Witnesses:
 ALBERT NUFER,
 FRANCES NUFER.

It is hereby certified that in Letters Patent No. 1,175,230, granted March 14, 1916, upon the application of Max Buff, of Vohwinkel, near Elberfeld, and Alfred Thauss, of Deutz, near Cologne, Germany, for an improvement in "Sulfur Colors," errors appear in the printed specification requiring correction as follows: Page 1, line 12, for the word "surfur" read *sulfur;* page 2, transpose lines 28 and 29; and that the said Letters Patent should be read with these corrections therein that the same may conform to the record of the case in the Patent Office.

Signed and sealed this 18th day of July, A. D., 1916.

[SEAL.]

R. F. WHITEHEAD,
*Acting Commissioner of Patents.*

Cl. 8—1.